(No Model.)
2 Sheets—Sheet 1.
W. F. DE FOREST.
AUTOMATIC FLUID PRESSURE BRAKE MECHANISM.
No. 468,240.                     Patented Feb. 2, 1892.
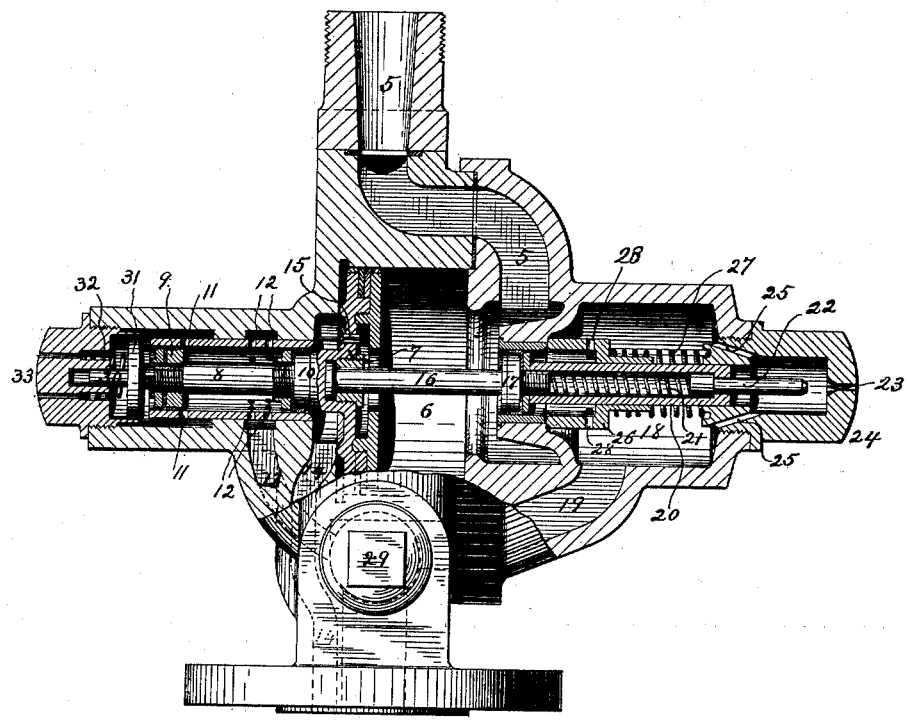
Fig. I.
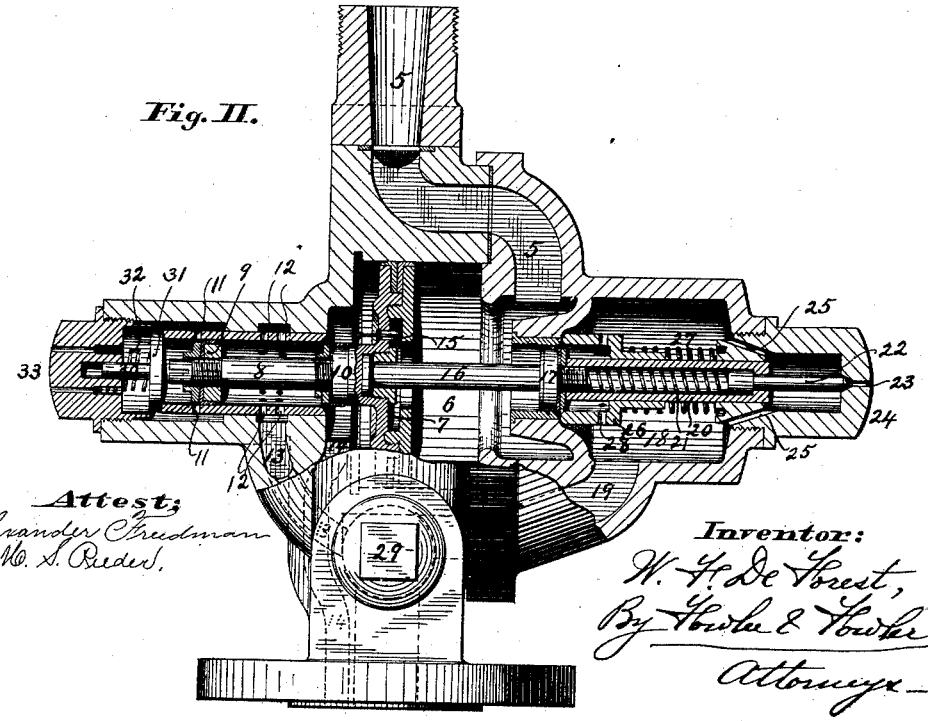
Fig. II.
Attest:
Alexander Friedman
M. S. Reeder
Inventor:
W. F. De Forest,
By Howe & Fowler
Attorneys (No Model.) 2 Sheets—Sheet 2.

W. F. DE FOREST.
AUTOMATIC FLUID PRESSURE BRAKE MECHANISM.

No. 468,240. Patented Feb. 2, 1892.

Attest:
N. W. Rihinip
Frank Moore

Inventor:
W. F. De Forest,
By Fowler & Fowler
Attorneys.

THE NORRIS PETERS CO., PHOTO-LITHO., WASHINGTON, D. C.

500
UNITED STATES PATENT OFFICE.

WYATTE F. DE FOREST, OF ST. LOUIS, MISSOURI, ASSIGNOR OF TWO-THIRDS TO HENRY O'HARA AND SAMUEL IRVING, OF SAME PLACE.

AUTOMATIC FLUID-PRESSURE BRAKE MECHANISM.

SPECIFICATION forming part of Letters Patent No. 468,240, dated February 2, 1892.

Application filed July 10, 1890. Serial No. 358,312. (No model.)

*To all whom it may concern:*

Be it known that I, WYATTE F. DE FOREST, a citizen of the United States, residing at St. Louis, in the State of Missouri, have invented a certain new and useful Improvement in Automatic Fluid-Pressure Brake Mechanism, of which the following is such a full, clear, and exact description as will enable any one skilled in the art to which it appertains to make and use the same, reference being had to the accompanying drawings, forming part of this specification.

My invention relates to an automatic fluid-pressure brake mechanism in which air is admitted from an auxiliary reservoir to put on the brakes for service stops, and is also admitted direct from the train-pipe to the brake-cylinder, together with the pressure in the auxiliary reservoir, to put on the brakes for emergency stops.

The object of the invention is to simplify and render more reliable and easy of operation such mechanism.

The invention will be best understood by referring to the accompanying drawings, the devices shown in which will now be described in detail, and the novel features thereof pointed out in the claims, making a part hereof.

Figure 3:
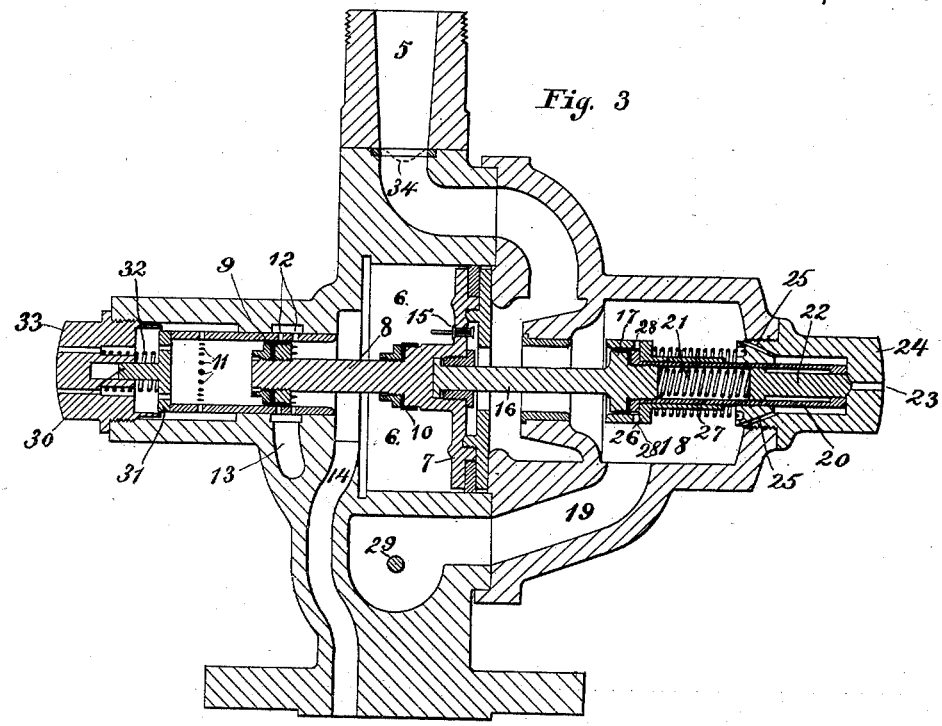
Figure 4:
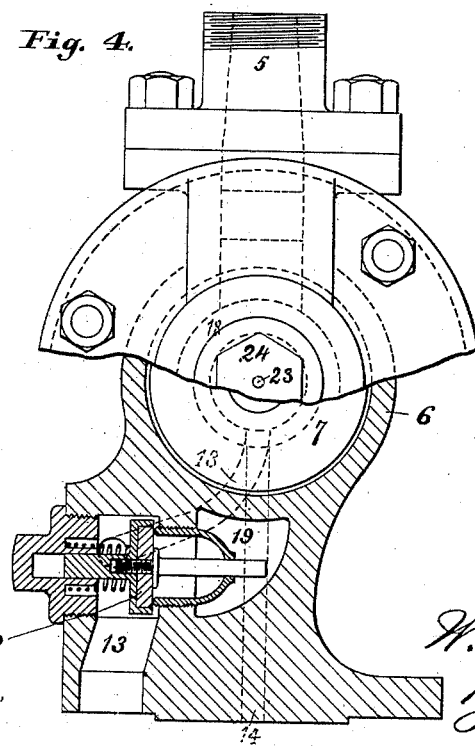

Figure 1 of the drawings is a side view, partly in section, of an automatic air-brake mechanism made in accordance with my invention, showing the parts in their normal positions. Fig. 2 is a similar view showing the parts in position for service stops; Fig. 3, the same view, wholly in section, representing the parts in position for emergency stops; Fig. 4, an end view of the same, one half in section, showing the check-valve for preventing back-pressure in section.

The same figures of reference indicate the same parts throughout the several views.

5 is the train-pipe, 6 the main-valve chamber, in which works a main piston-valve 7 of the ordinary construction. To this valve is connected a stem 8, which bears two piston-valves 9 10, that control, respectively, ports 11 12, the former of which are the exhaust-ports and in communication with the exterior air and the latter of which ports communicate with the brake-cylinder through a passage-way 13. The piston-valve 10 also controls communication between a passage-way 14 (which leads to the auxiliary reservoir and terminates between the main valve 7 and the chamber in which said piston-valves 9 and 10 work) and the passage 13.

In the main piston-valve 7 is a feed-valve 15 of the usual construction, the protruding stem of which is adapted to strike against the head of the main chamber 6 when the valve is in its normal position, so as to open communication between the train-pipe (via the chamber 6) and the auxiliary reservoir through the passage-way 14. As soon as the main piston-valve 7 leaves its normal position the feed-valve 15 closes and cuts off communication with the train-pipe. At the other side of the main valve 7 extends a stem 16, rigidly connected thereto and bearing an emergency piston-valve 17, which is therefore directly connected with the main valve 7.

The piston-valves controlling the admission of air to the brake-cylinder for service stops being upon one side of the main valve and the emergency-valve upon the other side thereof and being of equal area cause the valve mechanism to be balanced and render it responsive to slight reductions of pressure in the train-pipe. Were the emergency-valve disconnected from the main valve the valve mechanism would not be evenly balanced. Such a valve mechanism moves with but slight friction and is superior to the slide-valve mechanism, as all slide-valves must of necessity to be held to their seats with more or less force, which of course means friction. This emergency-valve 17 controls the admission of air from the train-pipe to a chamber 18, which is in communication with the brake-cylinder by way of a passage 19. The emergency-valve 17 has at its other side a sleeve 20, in which is arranged a coiled spring 21, the outer end of which bears against a movable graduating-stem 22, that is adapted to close a port 23 in the cap 24. The movable graduating-stem 22 closes this port when the air is admitted from the auxiliary reservoir to the brake-cylinder. The object of having the stem 22 control the port 23 is to relieve the pressure of air that gets upon the right-hand side of the emergency-valve when the brakes are set, in order that the main piston may be balanced. The movement of the mechanism to the left will open the port 23, and thus relieve the pressure on the right-hand side of the emergency-piston.

For service stops the engineer lets five or ten pounds slowly out of the train-pipe, which causes the main piston-valve 7 to leave its normal position and close the feed-valve 15. At the same time the piston-valve 9 closes the exhaust-ports 8, and the piston-valve 10 passes slightly out of its chamber enough to leave a small space between it and its chamber, whereby the air from the auxiliary reservoir passes through the passage 14 and the ports 12 to the passage-way 13 and brake-cylinder. (See Fig. 2.) While this is occurring the emergency-valve 17 and the sleeve 20, connected thereto, have caused the movable stem 22 to close the port 23, and the spring in said sleeve 20 prevents the parts from moving farther toward the right, and thus graduates the movement of the parts. As soon as the engineer allows the pressure in the train-pipe to resume its normal position the main valve 7 and all parts connected thereto are forced to their original positions, as clearly shown in Fig. 1.

About the sleeve 20, that is connected to the emergency-valve 17, is arranged, preferably, a movable cup or cylinder 26, which is held in its normal position by a spiral spring 27, coiled around the sleeve 20 and resting at its other end against the cap 24. The edges of this cup come against the edges of the chamber in which the emergency piston-valve 17 works, and the two together, being of the same bore form a cylinder in which the emergency-valve 17 works. The cup 26 has ports 28, which prevent the air from being imprisoned therein and compressed by the emergency-valve 17, and thus prevent said valve from moving the cup 26 until the valve comes solidly against it. This cup serves to better guide the emergency-valve and allows it to pass back more readily into the cylinder in which it normally works. For emergency stops the engineer reduces the pressure in the train-pipe five or ten pounds quickly. The main valve 7 in consequence thereof performs the full limit of its stroke, and in addition to operating, as aforesaid, also causes the emergency-valve 17 to pass into the cup 26, compressing the spring 27 of said cup, as well as causing compression of the spring 21 and drives said cup from its seat, allowing the train-pipe to communicate with the brake-cylinder directly through the chamber in which the emergency piston-valve 17 normally works via the chamber 18 through the passage-way 19, all as clearly shown in Fig. 3. When the pressure in the train-pipe is allowed to resume its normal position, it forces the main valve 7 back to its extreme left-hand position, the emergency-valve 17 passes back into its cylinder, leaving the cup 26, which now comes against the edges of the cylinder in which the emergency-valve 17 works, and all the parts resume their original positions. The air is thereupon exhausted from the brake-cylinder through the passage-way 13, the ports 12, and the exhaust-ports 11, and the brakes are thus taken off. The air in passing from the train-pipe direct to the brake-cylinder passes through a check-valve 29, which may be of any preferred form and to which I make no claim herein, the same being old and well known in fluid-pressure automatic brake mechanisms. This check-valve merely acts to prevent back-pressure from the brake-cylinder to the train-pipe.

It will be noted that the valves 9 and 10, as well as the emergency-valve 17, are piston-valves and are all packed with leather. In fluid-pressure brakes piston-valves operate with less friction than slide-valves, and when packed with leather do not leak as much as slide-valves and are just as serviceable.

So far as I am aware I am the first to use at the places indicated in fluid-pressure brake mechanism piston-valves, particularly when packed with leather. Piston-valves are only practical in this connection when packed with leather, rubber, or other like flexible packing, and are more reliable in operation when so packed than are slide-valves. It will be noted that the valve 10 passes out of its cylinder each time the mechanism is operated both for service and emergency stops, and also that the emergency-valve passes out of its cylinder when emergency stops are made. In order to permit these valves to pass out of their cylinders and move back into the same readily again, leather packing, preferably in the form of cup-leathers, as shown in the drawings, is necessary. Metallic and other such packing would not permit this. It will thus be evident that leather-packed valves or their equivalents are essential to and of great importance in my invention. They simplify the construction, in that they do away with additional valves, for by means of such construction the piston 10 may pass out of its cylinder and open direct communication between the auxiliary reservoir and the brake-cylinder, no other ports or valves being necessary. The leather packing of the emergency-valve also enables it to pass out of its cylinder back into the same and open and close direct communication between the train-pipe and the brake-cylinder without the intermediary of additional valves and ports.

30 is a retaining-stem, which is provided with a head 31 and has coiled about it a spiral spring 32. It is arranged upon the cap 33 at that end of the mechanism in which the piston-valves 9 and 10 work. It will be noted that the head 31 of the retaining-stem 30 fits loosely the bored-out part of the plug 33 and has also perforations through it. The plug 33 likewise has holes through it leading to the atmosphere, so that the exhaust-ports 11, before described, may communicate freely with the atmosphere. Should the pressure when the brakes are on, as shown in Fig. 2, become slightly greater on the right-hand side of the emergency piston-valve 17 than it is upon the left-hand side thereof, the valves would move toward the left and take off the brakes, as before explained. The retaining-stem 30 resists this movement, for when the valves start to move to the left the stem 8, connected with said main valve, strikes the head 31 of the retaining-stem and prevents further movement toward the left, and thereby keeps the brakes set as long as desired. This retaining-stem 30 acts, in conjunction with the graduating-stem 22 and port 23, before described, to aid in preventing the movement referred to and to hold the brakes set. It is an additional safeguard for this purpose and may or may not be used, it being employed only as a buffer for the stem 8 to strike against and not as a valve to control port.

34 is a wire-netting, which is placed in some part of the train-pipe to prevent dirt and grit from passing from the train-pipe into the valve mechanism.

Having now fully set forth my improvements, what I desire to claim, and secure by Letters Patent of the United States as my invention, is—

1. An automatic fluid-pressure brake mechanism having an ordinary main piston-valve working in a suitable chamber, piston-valves carried by a stem extending from one side of said main piston-valve, together therewith forming a triple valve for governing the admission of air from the auxiliary reservoir to the brake-cylinder and also its eduction therefrom, and an emergency piston-valve of substantially the same area as the piston-valves carried by the stem of the main valve and arranged upon a stem extending from the other side of said main valve and controlling communication between the train-pipe and brake-cylinder, whereby a sensitive quick-acting balanced piston-valve mechanism for service and emergency stops is formed.

2. An automatic fluid-pressure brake mechanism having an ordinary main valve and other valves controlled thereby, together constituting a triple valve for governing the admission of air from the auxiliary reservoir to the brake-cylinder and also its eduction therefrom, an emergency piston-valve connected directly to and moving with said main valve, said emergency piston-valve working in a cylinder or chamber when service stops are made, but adapted to pass out of said cylinder and open direct communication therethrough between the train-pipe and the brake-cylinder when emergency stops are to be made, and a movable cup forming a continuation of the chamber in which said emergency-valve works, having a spring for holding it in and returning it to its normal position and resisting further movement of the main valve when service stops are made.

3. An automatic fluid-pressure brake mechanism having an ordinary main valve and other valves controlled thereby for governing the admission of air from the auxiliary reservoir to the brake-cylinder and also its eduction therefrom, an emergency-valve connected directly to and moving with said main valve, a spring-actuated graduating-stem carried by said emergency-valve, and an exhaust-port controlled by said graduating-stem to relieve the pressure on that side of the emergency-valve opposite to the main-valve and train-pipe pressure, whereby the brakes may be held set when put on.

4. An automatic fluid-pressure brake mechanism having an ordinary main valve, a stem extending therefrom carrying valves for controlling the admission of air from the auxiliary reservoir to the brake-cylinder and also its eduction therefrom, a spring-actuated retaining-stem which resists the return movement of the mechanism after the brakes have been put on in order to hold them set, an emergency-valve connected directly to and moving with said valve, a spring-actuated graduating-stem carried by said emergency-valve, and an exhaust-port controlled by said graduating-stem to relieve the pressure on that side of the emergency-valve opposite to the main-valve and train-pipe pressure, whereby the brakes may be held firmly set after being put on.

5. An automatic fluid-pressure brake mechanism having an ordinary main valve and other valves controlled thereby, together constituting a triple valve for governing the admission of air from the auxiliary reservoir to the brake-cylinder and also its eduction therefrom, an emergency piston-valve connected directly to and moving the said main valve, said emergency-piston working in a cylinder or chamber when service stops are made, but adapted to pass out of said cylinder and open direct communication therethrough between the train-pipe and the brake-cylinder when emergency stops are to be made, a sleeve having a spiral spring and graduating-stem carried by said emergency-valve, an exhaust-port controlled by said graduating-stem to relieve the pressure on that side of the emergency-valve opposite the main-valve and train-pipe pressure, and a movable cup forming a continuation of the chamber in which said emergency-valve works, arranged about the aforesaid sleeve and provided with a spiral spring, substantially as described.

In testimony whereof I have hereunto set my hand and affixed my seal, this 7th day of July, 1890, in the presence of the two subscribing witnesses.

WYATTE F. DE FOREST. [L. S.]

Witnesses:
A. C. FOWLER,
J. A. ARNOLD.